(No Model.) 3 Sheets—Sheet 1.

C. S. RUEF.
WHEEL PLOW.

No. 353,234. Patented Nov. 23, 1886.

WITNESSES  
Cyrus Kehr  
Charles H. Roberts

INVENTOR  
Charles S. Ruef  
By Manahan & Ward  
His Attys (No Model.) 3 Sheets—Sheet 2.

C. S. RUEF.
WHEEL PLOW.

No. 353,234. Patented Nov. 23, 1886.

WITNESSES
Cyrus Kehr
Charles H. Roberts

INVENTOR
Charles S. Ruef
By Manahan & Ward
His Att'ys (No Model.)  3 Sheets—Sheet 3.
C. S. RUEF.
WHEEL PLOW.
No. 353,234.  Patented Nov. 23, 1886.
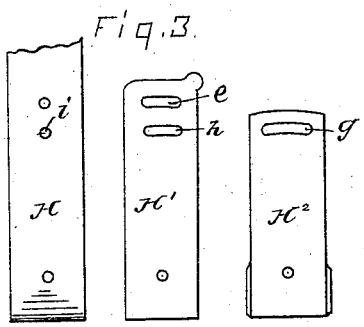
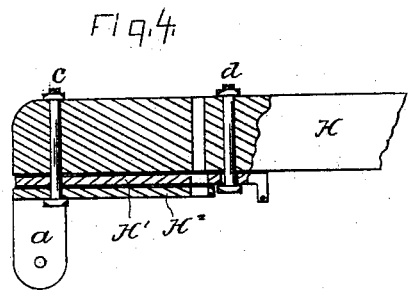
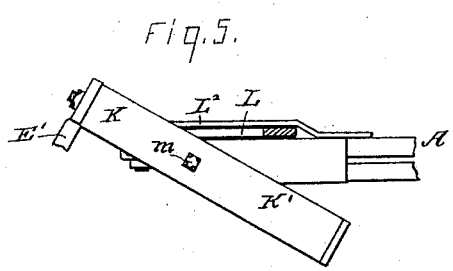
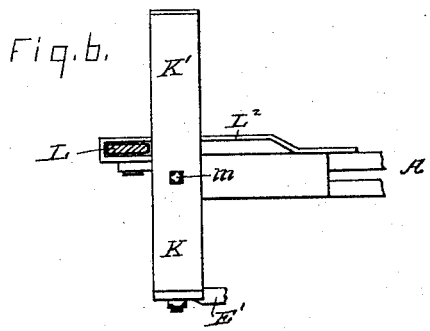
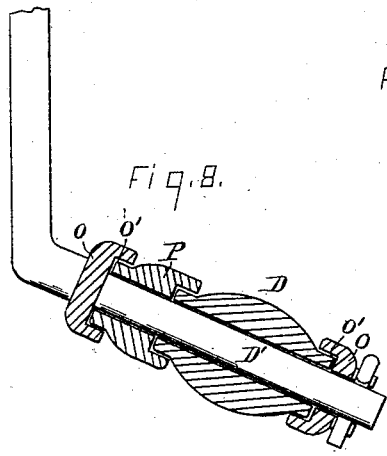
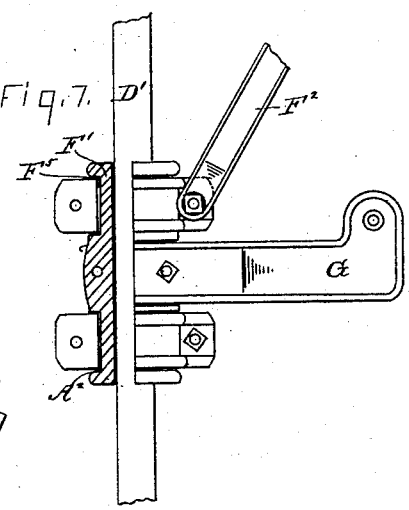
WITNESSES—
Cyrus Kehr,
Charles H. Roberts.
INVENTOR—
Charles S. Ruef
By Manahan & Ward
His Atty

UNITED STATES PATENT OFFICE.

CHARLES S. RUEF, OF DIXON, ILLINOIS, ASSIGNOR TO THE GRAND DE TOUR PLOW COMPANY, OF SAME PLACE.

WHEEL-PLOW.

SPECIFICATION forming part of Letters Patent No. 353,234, dated November 23, 1886.

Application filed September 11, 1886. Serial No. 213,344. (No model.)

*To all whom it may concern:*

Be it known that I, CHARLES S. RUEF, a citizen of the United States, residing at Dixon, in the county of Lee and State of Illinois, have invented certain new and useful Improvements in Wheel-Plows; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention has reference to that class of plows in which the plow is carried on three wheels, and pertains more especially to novel mechanism for turning the plow, mechanism for adding the third horse thereto, and mechanism for adjusting the depth and width of the cut, and for keeping the bottom of the plow substantially level.

Figure 1:
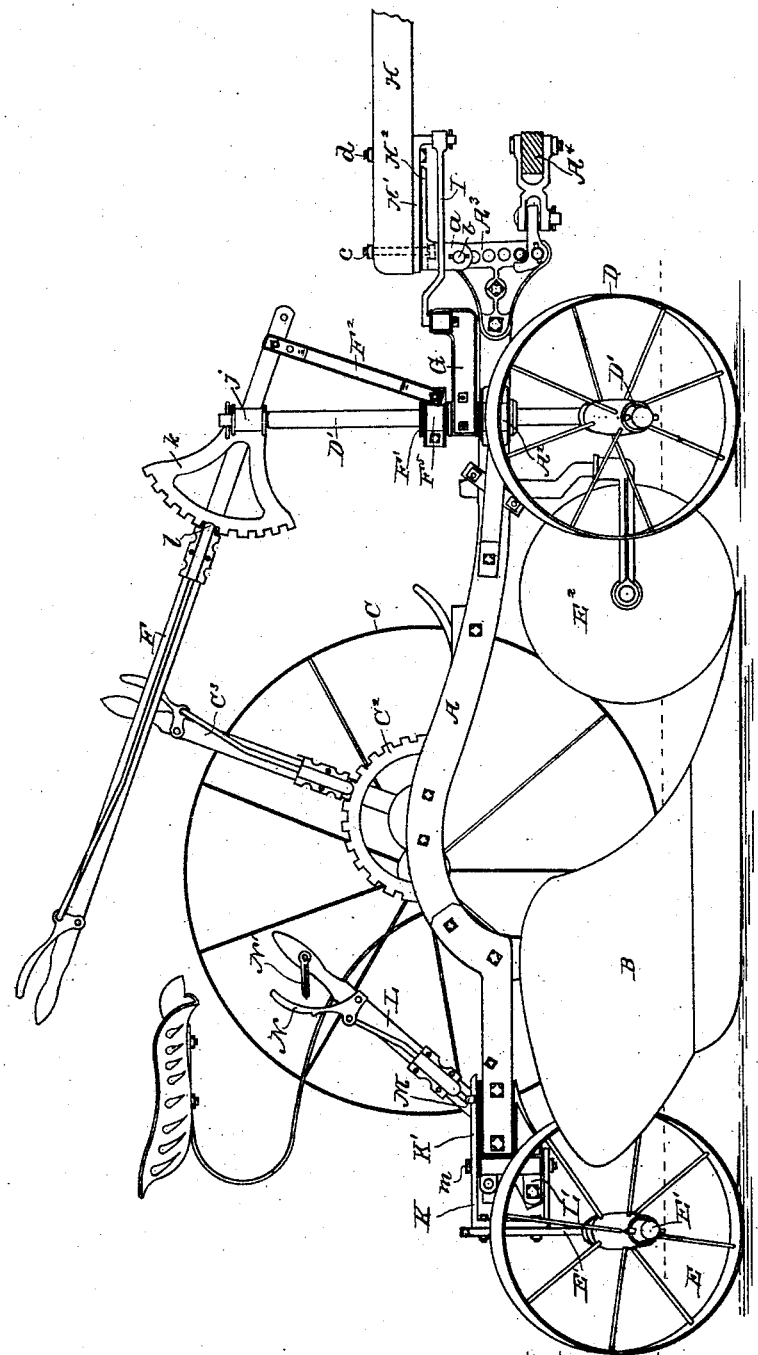
Figure 2:
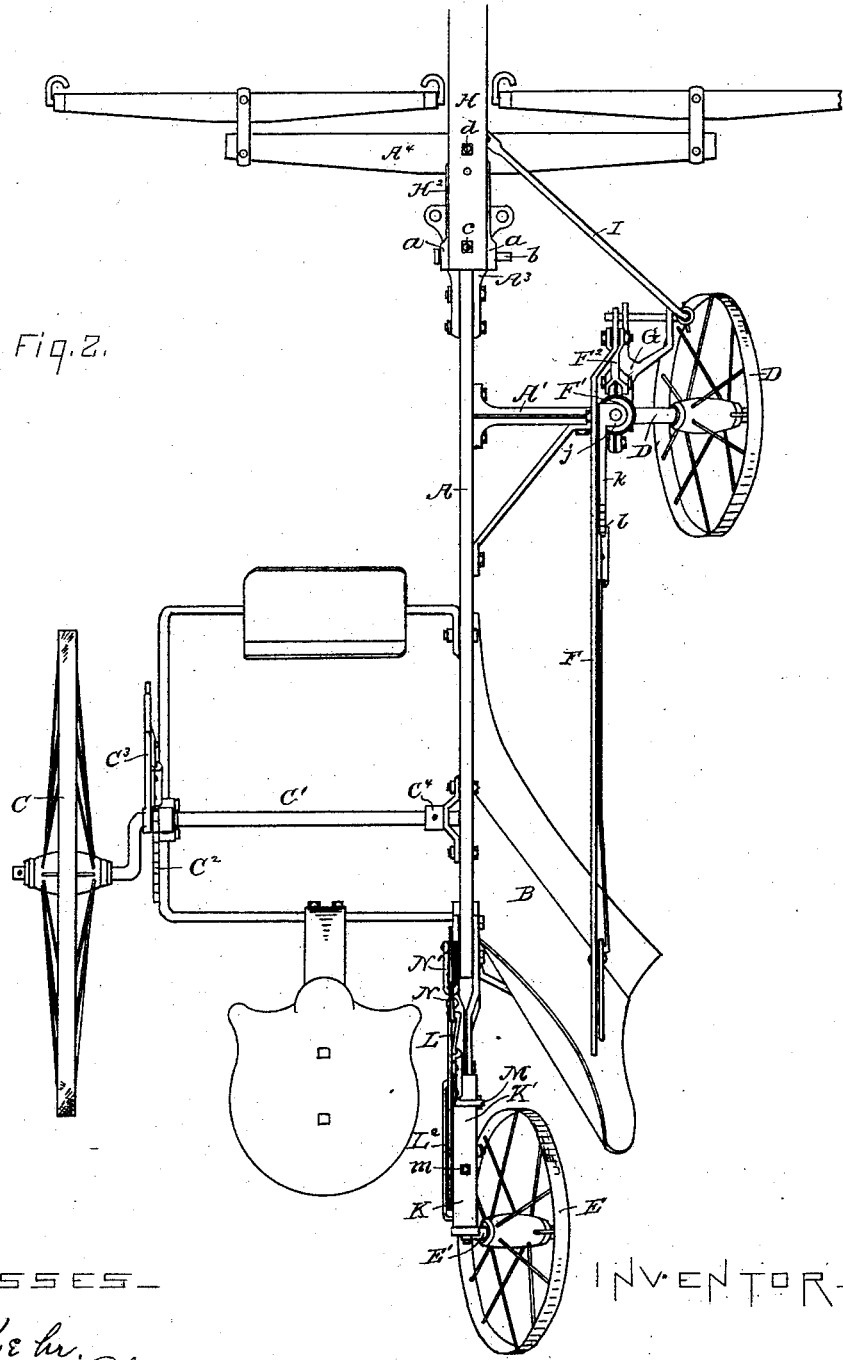

In the drawings, Figure 1 is a side elevation of a plow embodying my invention. Fig. 2 is a plan thereof. Figs. 3 and 4 are details of the mode of attaching the tongue. Figs. 5 and 6 are details of the mode of attaching the rear wheel. Fig. 7 represents, partly in section, the adjustable sleeve on the gage standard. Fig. 8 is a detail of the mode of varying the width of tread of the front wheel.

A is the plow-beam, to which is suitably attached the plow B. The plow and beam are supported on the inner wheel, C, front furrow-wheel, D, and rear furrow-wheel, E. The wheel D traverses the inner angle of the outer furrow, or the furrow in which the "off" horse walks, and the rear wheel, E, traverses the inner angle of the furrow behind the plow. Both of these furrow-wheels are set at an angle to the perpendicular, with their lower edge projecting inward, thus overcoming the tendency of the plow to crowd toward the unplowed ground, and thereby dispensing with the "landside" and its consequent friction.

$E^2$ is the usual caster-seated rolling colter.

D' is the axle of the wheel D, and at a short distance within the wheel D is turned upward to form the fulcrum for the gage-lever F. The vertical portion of the axle D' is formed of four equal sides, and is fitted with an inner sleeve, F'. The sleeve F' is attached to the beam A by means of a short cross-beam, A', attached at its inner end to the beam A, and collared at its outer end in the lower annular horizontal recess, $A^2$, on the exterior of the sleeve F'. A lifting-arm, $F^2$, is collared at its lower end in a like upper annular horizontal recess, $F^5$, on the exterior of the sleeve F', and is pivoted at its upper end to the front end of the gage-lever F. This construction permits the lateral rotation or oscillation of the axle D', carrying with it the sleeve F' and wheel D, and thus giving direction to the latter without cramping the lever F or beam A.

A guide-bar, G, is rigidly attached at its rear end to the central portion of the sleeve F', and has its front end furnished with modes of attachment, as hereinafter described. The front end of the beam A is provided with the usual clevis, $A^3$, having a vertical series of attachment-holes, and to such clevis is suitably attached the double-tree $A^4$.

The tongue H, whose main function is to twist or turn the axle D' horizontally, and thus turn the plow, is attached at different points, contingent upon whether two or three horses are used. When but two horses are used, the tongue is placed at the front end of the beam A and attached to clevis $A^3$; but to permit its lateral oscillation, independent of the beam, is pivoted as follows:

In Fig. 3 are shown the rear end of tongue H, upper tongue-plate, H', and lower tongue-plate, $H^2$. The lower plate has downwardly-projecting jaws $a$, adapted to be attached to the clevis $A^3$, at the front end of the beam A, when two horses are used, or to the front end of guide-bar G when three horses are used, being fastened by a cross-pin, $b$, passing through said jaws $a$ and such clevis and guide-bar, respectively. The plate H' is interposed between the plate $H^2$ and tongue H, and the three parts united by the rear vertical bolt, $c$. The interposed plate H' is further adjustably held against the tongue H by the front vertical bolt, $d$, which is passed through the outer slot, $e$, in said plate H', and through the tongue H. When the tongue is placed in the clevis $A^3$, at the end of the beam A, the plates H' and $H^2$ are not connected, save by the rear vertical bolt, c, which latter permits the tongue H and plate H' to oscillate together on plate H². The front end of the plate H' is connected by a diagonal arm, I, to the front end of the guide-bar G, and thus any side movement of the tongue H rotates proportionately the vertical portion of the axle D', and thereby gives direction to the wheel D for the purpose of turning, &c.

The upper end of the axle D' has a pivotal connection, as a fulcrum, to the guide-lever F. When three horses are used and the tongue is placed in the front end of the guide-bar G, a third vertical bolt or the bolt d is passed through the slot g in plate H², the interior slot, h, in plate H', and the interior hole, i, in tongue H, and these three parts thereby rendered integral, and the diagonal arm I is dispensed with, as the lower plate, H², being attached by cross-pin b directly to the guide-bar G, the movements of the tongue H are communicated directly to said bar G, and the latter being rigidly attached at its rear end to the sleeve F', the tongue H guides and turns the wheel D.

On the loose collar j, which constitutes the fulcrum of the gage-lever F, is attached the segmental ratchet k, which, being engaged by pawl l, seated on the lever F, serves to hold said lever at any desired altitude, and the sleeve F' being adapted to move vertically on the vertical part of the axle D' as actuated or held by the lifting-arm F², the plow is held at any desired elevation or gaged as to its depth of running.

The inner wheel, C, traverses the unplowed ground, and is seated on the usual crank-axle, C', the inner end of which passes through the sleeve C¹, attached to the side of the beam A, and rests against the inner face of the latter, and by means of the usual ratchet-lever, C³, and segment-rack C² said axle C' is rotated to "even up" that side of the plow. The rear wheel, E, not only serves to assist in carrying the plow level and holding it out of "land," but is also adapted to assist in turning either way, or can be locked rigidly to hold the rear of the plow against lateral movement in backing the plow by the following mechanism:

The wheel E is seated on an axle, E', which is bent upward at its inner portion and attached rigidly to the rear of a clevis, K, pivoted on a vertical bolt, m, passed through such clevis and the rear end of the beam A. The clevis K has a long upper side, K', which extends forward of the pivot m. A hand-lever, L, has its lower end suitably pivoted below the rear of the beam A to a projection, L', attached in a suitable way to said beam, and is thus adapted to be thrown forward or back along the inner face of said beam, being held in a guide, L². On the outer face of the lever L is placed a movable clutch, M, adapted to be held or reciprocated by the usual draw-lever, N, fulcrumed on the side of the lever L and held by link N'. The clutch M is designed to engage the long end K' of the clevis K, and thus control the wheel E. Three conditions of the wheel E are thereby assured, to wit: When the lever L is thrown forward and the clutch M caused to engage the end K' of clevis K, such clevis, and perforce the wheel E, is held rigidly in line with the beam A. With the lever L forward and the clutch M held out of engagement with clevis K the face of the lever L prevents the end K' from swinging inward, but permits it to swing outward, in which position the plow can be turned to the left, the caster attachment of the wheel E causing the rear of the clevis to twist or turn inward. When the lever L is thrown backward to the rear end of the guide L², with the clutch M disengaged, the condition is the reverse of that last named. The face of the lever L prevents the rear end of the clevis K from swinging inward, but permits such rear end to swing outward and its front end inward, when the plow can be turned to the right. (See Figs. 5 and 6, in the first of which the wheel E can swing inward and in the last of which it can swing outward. Inward, as here used, means toward the unplowed land.)

The width of tread of the wheel D, as compared to the inner line of the plow, is regulated as follows: On that portion of the axle D' used as a seat for the wheel D are seated sand-bands O O, having inner concaved faces O', adapted, respectively, to overlap and seal either end of the hub of the wheel D. A movable washer, P, having its outer end adapted to enter concaves O', and its inner end provided with concave face P', to overlap and seal the end of said hub, is placed at either end of such hub, with its face P' adjacent thereto. The washer P can be of variant widths and can be placed at either end of the hub of wheel D, and thereby the dirt is not only excluded, but the wheel D can be adjusted in or out on the axle D', as desired. By adjusting the depths of the plow on the axle D' the tread of the wheels D and E and the bottom of the plow run on the same plane, and the relation of the plow B to the beam A is never changed, as it is in cases where the depth of the plow is regulated by tilting its standard.

What I claim as my invention, and desire to secure by Letters Patent of the United States, is—

1. In combination with the beam A and plow B, brace A', axle D', sleeve F', seated on said axle, wheel D, and arm G, rigidly attached to said sleeve, substantially as shown, and for the purpose described.

2. The combination of the wheel D, axle D', sleeve F', seated vertically adjustable on said axle, beam A, pivotally attached to said sleeve, lever F, pivotally fulcrumed on said axle, and lifting-arm F², pivotally attached to said sleeve, substantially as shown, whereby the altitude of the plow can be adjusted, while the wheel D may be free to be drawn into various positions relative to said beam.

3. The combinations of the tongue H, plates H' and H², arm I, guide-bar G, rigidly attached to sleeve F', axle D', sleeve F', seated on said axle, and wheel D, substantially as shown, and for the purpose described.

4. The combination, with the tongue H, plates H' and H², and beam A, with brace A', of the wheel D, axle D', sleeve F', seated on said axle, and guide-bar G, rigidly attached to said sleeve, substantially as shown, and for the purpose described.

5. The combination of the wheel E, axle E', beam A, clevis K, having elongated end K', and pivoted on the beam A, lever L, lever N, and clutch M, substantially as shown, and for the purpose described.

6. The combination of the wheel E, pivotally seated in the clevis K, the beam A, the clevis K, and the clutch M, adapted to clasp and hold said clevis parallel with said beam, whereby the plow can be backed without its rear end swinging laterally, substantially as shown.

In testimony whereof I affix my signature in presence of two witnesses.

CHARLES S. RUEF.

Witnesses:
CHARLES C. BUELL,
WILLIAM W. MURPHY.